Feb. 9, 1932.  J. R. OISHEI ET AL  1,844,675
REAR VIEW MIRROR
Filed Feb. 19, 1929
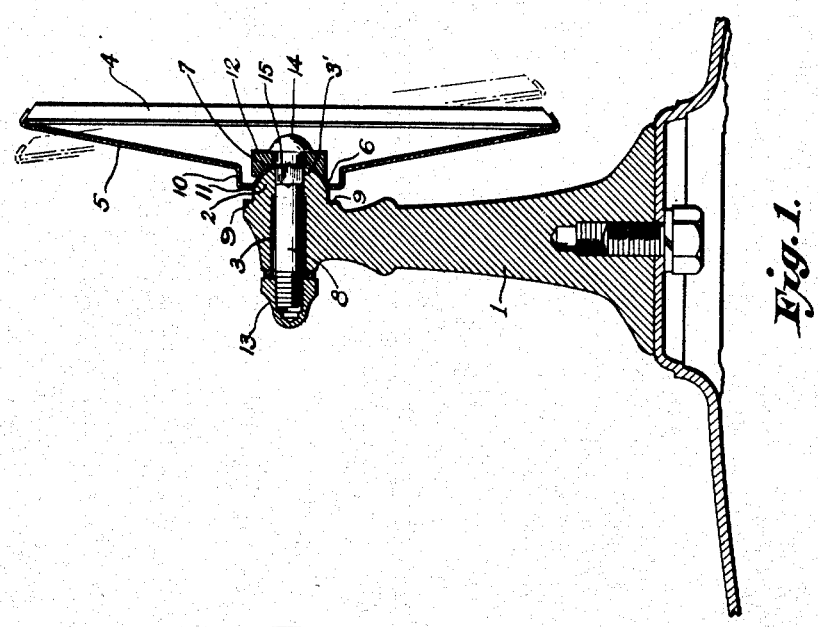
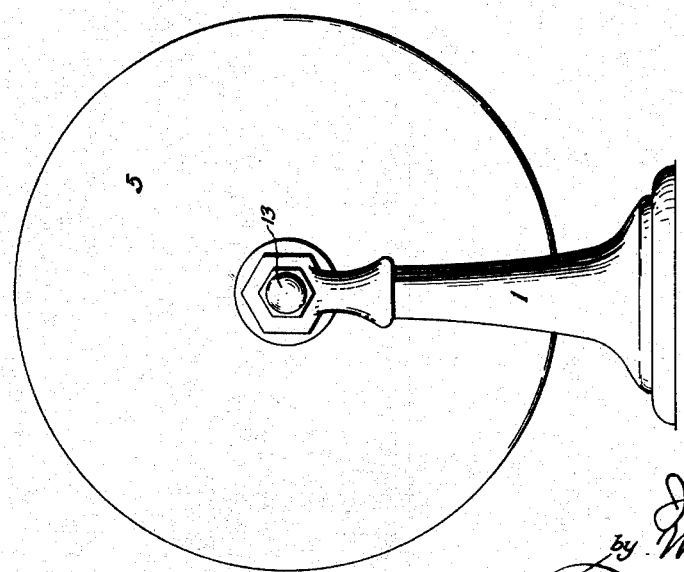

Patented Feb. 9, 1932

1,844,675

UNITED STATES PATENT OFFICE

JOHN R. OISHEI AND WILLIAM PAULUS, OF BUFFALO, NEW YORK, ASSIGNORS TO TRICO PRODUCTS CORPORATION, OF BUFFALO, NEW YORK

REAR VIEW MIRROR

Application filed February 19, 1929. Serial No. 341,073.

This invention relates to rear view mirrors for automobiles and it has for its primary object to provide a novel and practical, universal mount for the reflector body.

Heretofore, in the mounting of mirrors on a support it has been customary to provide the reflector body with a projecting ball adapted to be adjustably clamped in a sectional socket construction. The formation of the ball part and its attachment to the reflector body have been a considerable item of expense in the commercial production of a rear view mirror.

The present invention aims to provide a simplified form of ball and socket mounting, and the invention has for its particular objects to embody one part of the ball and socket mounting directly in the back of the reflector body; to shape the metal back of the reflector body with a socket into which a ball part on the supporting standard or bracket may adjustably fit; to provide a simple means of adjustment for the reflector body on the ball part to cooperate with the latter in clamping the socket-carrying member to the ball-carrying member; to substantially conceal the clamping mechanism or parts to view; and to improve the neat appearance of the rear view mirror generally by the absence of exposed adjustments.

In the drawings,

Fig. 1 is a vertical, sectional view, with parts being left in elevation, through the improved rear view mirror clearly depicting the adjustable or universal mount.

Fig. 2 is a rear view of the improved mirror.

Referring more in detail to the accompanying drawings, the numeral 1 designates the supporting bracket, herein depicted in the form of a standard, which is formed with a laterally extending ball part 2 of substantially hemispherical shape. A transverse bore or opening 3 is formed in the upper part of the standard 1 along a line substantially axial of the base of the ball part 2, the inner end 3' of the socket being preferably non-circular and opening through the zenith point or vertex of said ball part 2, as shown in Fig. 1. The ball part has been herein depicted as being carried by the standard and the socket part by the reflector body but obvious reversal of these parts is within the spirit and scope of this invention.

The reflector body 4 is provided with a metal back plate 5 which is formed with a dished seat or socket 6 conformably receiving the ball part 2. The bottom of the socket is cut away, as at 7, to freely receive the clamp bolt 8, thereby to have sufficient clearance to permit of certain unrestricted movement of the socket about the ball part as defined by the wall of the opening 7 engaging with the bolt 8. Shoulders 9 are formed on the standard at the base of the hemispherical ball part 2, and the back plate 5 is formed with a cylindrical boss 10 from the end wall of which is depressed the socket 6. This provides an annular shoulder 11 about the socket for cooperating with the stop shoulders 9 in also defining the limits of adjustment for the reflector body.

A clamping head 12 is disposed within the back plate 5 and formed with a jaw face for conformably engaging the convex exterior of the socket part 6, the latter being clamped against the ball part 2 as the head 12 is drawn firmly to its operative position by screwing the nut 13 against the bearing at the opposite side of the bracket or standard 1. This head 12 is preferably manufactured separate from the bolt 8 and has an opening for receiving the same in such a manner that the bolt head 14 overhangs the head 12. The bolt 8 is held against substantial lateral play, and to hold the bolt from turning with the nut, the same has a non-circular section 15 fitting the non-circular section 3' of the bore 3.

In using this rear view mirror, the nut 13 is first loosened so that the clamping head 12 will release the socket part 6 for sliding around on the ball part 2, except as restricted by the wall of the opening 7 engaging with the bolt 8, or the coaction of the stop shoulders 9 and 11. The range of adjustment permitted by these cooperating stop parts is ample to accommodate for the different adjustments required for the normal functioning of the mirror. After the desired adjustment has been obtained the nut 13 is tightened to pull on the bolt 8 and cause the head 12 to firmly clamp the interposed socket part 6 against the ball part 2.

This improved mount provides for universal adjustment. All of the working parts are concealed to view, with the exception of the nut 13 which may be finished off in harmony with the structural lines of the bracket or standard 1, thereby affording a neat appearance to the general make-up of the rear view mirror without sacrificing the advantages obtained by the universal mounting of the same.

What is claimed is:

1. A rear view mirror comprising a rigid standard having an integral, convex, semi-spherical projection, said standard having an opening extending axially through the semi-spherical projection, a mirror plate having a partially spherical portion engaging said projection, said portion having an opening centrally thereof of larger diameter than said first mentioned opening, and adjustable screw means extending through said openings and contacting the plate and the standard on the sides thereof opposite said projection.

2. A rear view mirror comprising a rigid standard having a convex, semi-spherical projection, said standard having an opening extending axially through the semi-spherical projection, said opening being non-circular at the end thereof in said projection, a mirror plate having a partially spherical portion with its concave face engaging said projection, said portion having an opening centrally thereof and of larger diameter than the first mentioned opening, a clamping member having a bore larger than said first mentioned opening, and a concave face engaging the convex face of said partially spherical portion, and an adjusting shank extending through the opening in the standard, the opening in the mirror plate, and the bore of the clamping member, said shank at one end having a head abutting the clamping member, a non-circular portion engaging in the non-circular opening in the projection, and a portion between the head and non-circular portion in the bore of clamping member whereby the clamping member may rotate thereon, and said shank at its opposite end being threaded to adjustably receive a threaded cap.

JOHN R. OISHEI.
WILLIAM PAULUS.